United States Patent
Chan

(10) Patent No.: US 11,451,081 B2
(45) Date of Patent: Sep. 20, 2022

(54) CHARGING DEVICE SUPPORTING POWER DELIVERY

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 203 days.

(21) Appl. No.: 16/987,992

(22) Filed: Aug. 7, 2020

(65) Prior Publication Data

US 2021/0313823 A1 Oct. 7, 2021

(30) Foreign Application Priority Data

Apr. 1, 2020 (TW) .................................. 109111190

(51) Int. Cl.
*H02J 7/06* (2006.01)
*H02J 7/00* (2006.01)
*H02M 3/335* (2006.01)
*H02J 7/02* (2016.01)

(52) U.S. Cl.
CPC .............. *H02J 7/06* (2013.01); *H02J 7/0047* (2013.01); *H02J 7/00* (2013.01); *H02J 7/007182* (2020.01); *H02J 7/02* (2013.01); *H02J 2207/20* (2020.01); *H02M 3/33523* (2013.01)

(58) Field of Classification Search
CPC .... H02J 7/02; H02J 7/06; H02J 7/0047; H02J 7/007182; H02J 2207/20; H02M 1/32; H02M 3/33523; H02M 3/33592
See application file for complete search history.

(56) References Cited

U.S. PATENT DOCUMENTS

| 7,423,887 | B2* | 9/2008 | Yasumura | ......... | H02M 3/33507 363/21.02 |
| 10,862,399 | B1* | 12/2020 | Rai | .................... | H02M 3/33507 |
| 10,910,954 | B1* | 2/2021 | Shah | ....................... | H02M 7/06 |
| 2002/0001204 | A1* | 1/2002 | Lentini | ............. | H02M 3/33507 363/21.06 |
| 2013/0193940 | A1* | 8/2013 | Louvel | ................ | H02M 1/4225 323/282 |
| 2017/0025958 | A1* | 1/2017 | Yu | ........................... | G06F 1/263 |
| 2020/0258707 | A1* | 8/2020 | Su | ......................... | H01H 47/325 |
| 2021/0058000 | A1* | 2/2021 | Ahmed | ............. | H02M 3/33592 |
| 2021/0111578 | A1* | 4/2021 | Ou | ........................... | G06F 1/266 |

* cited by examiner

*Primary Examiner* — Drew A Dunn
*Assistant Examiner* — Tarikh Kanem Rankine
(74) *Attorney, Agent, or Firm* — McClure, Qualey & Rodack, LLP

(57) ABSTRACT

A charging device supporting PD (Power Delivery) includes a bridge rectifier, a first capacitor, a transformer, a power switch element, an output stage circuit, a feedback compensation circuit, a PWM (Pulse Width Modulation) IC (Integrated Circuit), a discharging circuit, and a controller. The bridge rectifier generates a rectified voltage according to a first input voltage and a second input voltage. The transformer includes a main coil and a secondary coil. The main coil receives the rectified voltage, and the secondary coil generates an induced voltage. The output stage circuit generates an output voltage according to the induced voltage and a first control voltage. The controller generates the first control voltage and a second control voltage according to the output voltage. The discharging circuit selectively reduces the voltage level of the output voltage according to the second control voltage.

13 Claims, 4 Drawing Sheets

CHARGING DEVICE SUPPORTING POWER DELIVERY

CROSS REFERENCE TO RELATED APPLICATIONS

This Application claims priority of Taiwan Patent Application No. 109111190 filed on Apr. 1, 2020, the entirety of which is incorporated by reference herein.

BACKGROUND OF THE INVENTION

Field of the Invention

The disclosure generally relates to a charging device, and more specifically, to a charging device supporting power delivery.

Description of the Related Art

A conventional charging device usually has to communicate with an electronic device before it can perform a charging operation on that electronic device. However, communicating and charging operations often fail when the electronic device does not meet safety input standards, and this may reduce the reliability of the charging device. Accordingly, there is a need to propose a novel solution for solving the problems of the prior art.

BRIEF SUMMARY OF THE INVENTION

In an exemplary embodiment, the invention is directed to a charging device supporting PD (Power Delivery). The charging device includes a bridge rectifier, a first capacitor, a transformer, a power switch element, an output stage circuit, a feedback compensation circuit, a PWM (Pulse Width Modulation) IC (Integrated Circuit), a discharging circuit, and a controller. The bridge rectifier generates a rectified voltage according to the first input voltage and the second input voltage. The first capacitor stores the rectified voltage. The transformer includes a main coil and a secondary coil. The main coil receives the rectified voltage, and the secondary coil generates an induced voltage. The power switch element selectively couples the main coil to a ground. The output stage circuit generates an output voltage according to the induced voltage and a first control voltage. The feedback compensation circuit is coupled to the output stage circuit. The feedback compensation circuit generates a feedback voltage. The feedback compensation circuit includes a linear optical coupler and a voltage regulator. The PWM IC generates a PWM voltage according to the feedback voltage. The controller monitors the output voltage, and generates the first control voltage and a second control voltage according to the output voltage. The discharging circuit selectively reduces the voltage level of the output voltage according to the second control voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows:

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
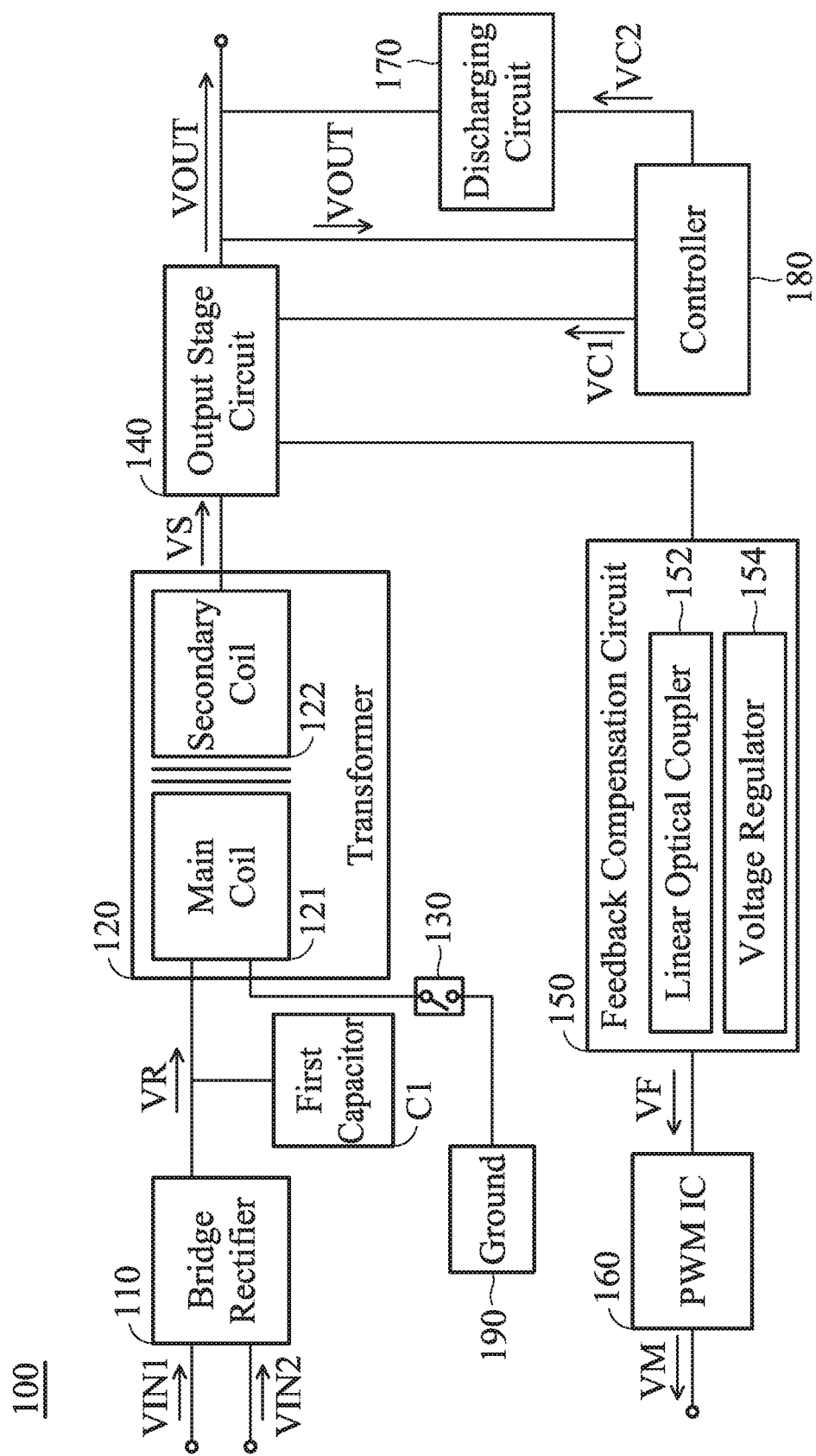
FIG. 1 is a diagram of a charging device according to an embodiment of the invention.

FIG. 1 is a diagram of a charging device 100 according to an embodiment of the invention. The charging device 100 can support PD (Power Delivery) and supply electric power to an electronic device, such as a smartphone, a tablet computer, or a notebook computer. As shown in FIG. 1, the charging device 100 includes a bridge rectifier 110, a first capacitor C1, a transformer 120, a power switch element 130, an output stage circuit 140, a feedback compensation circuit 150, a PWM (Pulse Width Modulation) IC (Integrated Circuit) 160, a discharging circuit 170, and a controller 180. It should be noted that the charging device 100 may further include other components, such as a processor, a display device, a touch control panel, a power supply module, and/or a housing, although they are not displayed in FIG. 1.

The bridge rectifier 110 generates a rectified voltage VR according to a first input voltage VIN1 and a second input voltage VIN2. The first input voltage VIN1 and the second input voltage VIN2 may be from an external input power source. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be about 110V or 220V, but it is not limited thereto. The first capacitor C1 can store the rectified voltage VR. The transformer 120 includes a main coil 121 and a secondary coil 122. The main coil 121 is positioned at a side of the transformer 120, and the secondary coil 122 is positioned at an opposite side of the transformer 120. The main coil 121 receives the rectified voltage VR. In response to the rectified voltage VR, the secondary coil 122 generates an induced voltage VS. The power switch element 130 selectively couples the main coil 121 to a ground 190. The ground 190 may mean the earth or any grounding path coupled to the earth, and it is not an internal component of the charging device 100. The output stage circuit 140 generates an output voltage VOUT according to the induced voltage VS and a first control voltage VC1. The feedback compensation circuit 150 is coupled to the output stage circuit 140, and is configured to generate a feedback voltage VF. The feedback compensation circuit 150 includes a linear optical coupler 152 and a voltage regulator 154. The PWM IC generates a PWM voltage VM according to the feedback voltage VF. The discharging circuit 170 selectively reduces the voltage level of the output voltage VOUT according to a second control voltage VC2. The controller 180 monitors the output voltage VOUT, and generates the first control voltage VC1 and the second control voltage VC2 according to the output voltage VOUT. With such a design, if the electronic device does not meet the safety input standard, the discharging circuit 170 of the charging device 100 will fine-tune the electronic device in advance, so as to guarantees that the whole charging operation can be completed successfully. Therefore, the invention can significantly improve the reliability and output stability of the charging device 100.

The following embodiments will introduce the detailed structure and operation of the charging device 100. It should be understood these figures and descriptions are merely exemplary, rather than limitations of the invention.

Figure 2:
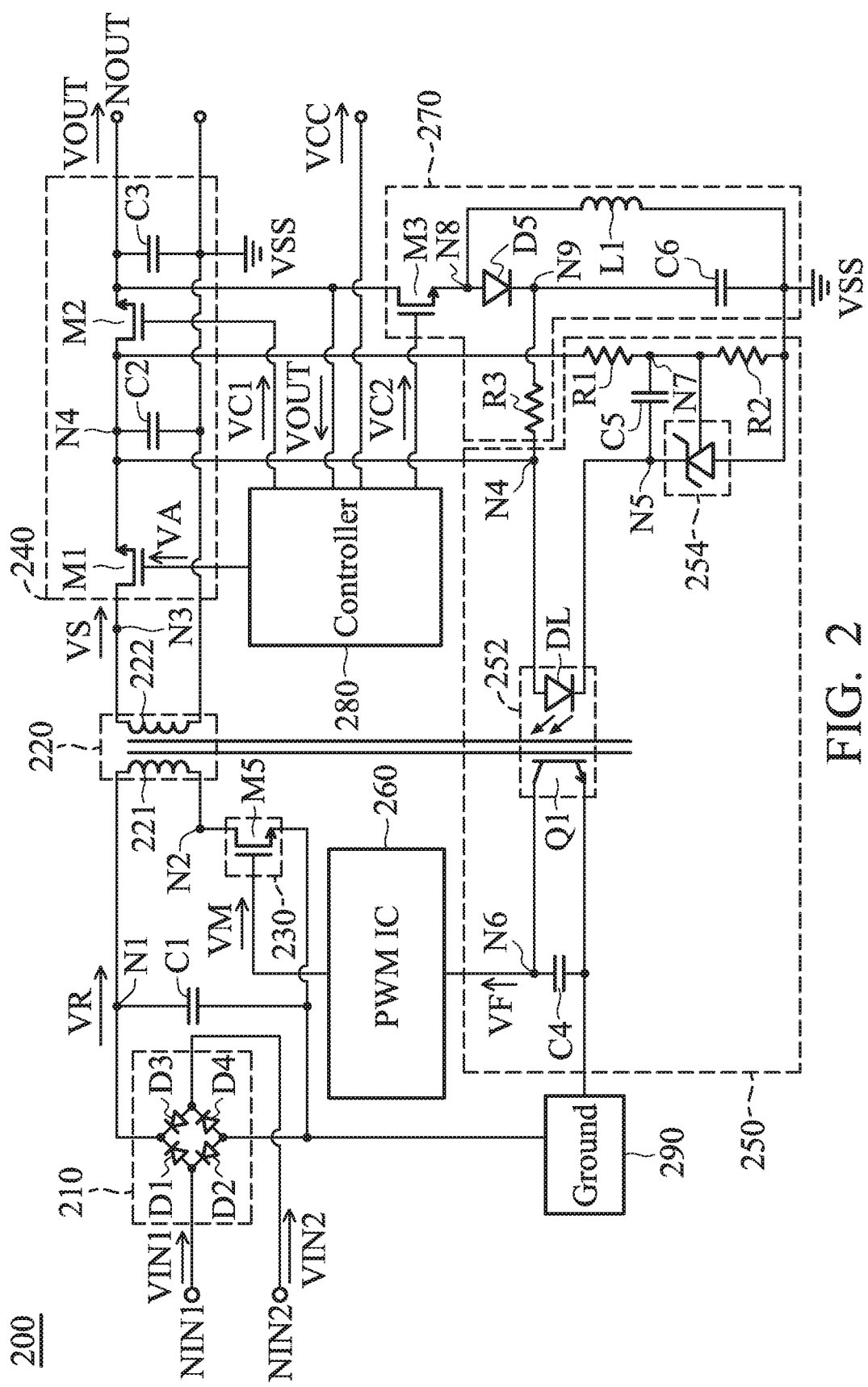
FIG. 2 is a diagram of a charging device according to an embodiment of the invention.

FIG. 2 is a diagram of a charging device 200 according to an embodiment of the invention. In the embodiment of FIG. 2, the charging device 200 with a first input node NIN1, a second input node NIN2, and an output node NOUT includes a bridge rectifier 210, a first capacitor C1, a transformer 220, a power switch element 230, an output stage circuit 240, a feedback compensation circuit 250, a PWM IC 260, a discharging circuit 270, and a controller 280. The first input node NIN1 and the second input node NIN2 of the charging device 200 are arranged for receiving a first input voltage VIN1 and a second input voltage VIN2 from an external input power source, respectively. The output node NOUT of the charging device 200 is arranged for outputting an output voltage VOUT to an electronic device 400 (referring to FIG. 4 as follows). Both of the charging device 200 and the electronic device 400 can support PD and the standard of USB (Universal Serial Bus) Type-C.

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to a ground 290, and a cathode coupled to the first input node NIN1. The ground 290 may mean the earth or any grounding path coupled to the earth, and it is not an internal component of the charging device 200. The third diode D3 has an anode coupled to the second input node NIN2, and a cathode coupled to the first node N1. The fourth diode D4 has an anode coupled to the ground 290, and a cathode coupled to the second input node NIN2.

The first capacitor C1 has a first terminal coupled to the first node N1 for receiving and storing the rectified voltage VR, and a second terminal coupled to the ground 290.

The transformer 220 includes a main coil 221 and a secondary coil 222. The main coil 221 is positioned at a side of the transformer 220, and the secondary coil 222 is positioned at an opposite side of the transformer 220. The main coil 221 has a first terminal coupled to the first node N1 for receiving the rectified voltage VR, and a second terminal coupled to a second node N2. In some embodiments, the power switch element 230 selectively couples the second node N2 to the ground 290 according to a PWM voltage VM. For example, if the PWM voltage VM has a high logic level, the power switch element 230 may couple the second node N2 to the ground 290 (i.e., the power switch element 230 is similar to a short-circuited path). Conversely, if the PWM voltage VM has a low logic level, the power switch element 230 may not couple the second node N2 to the ground 290 (i.e., the power switch element 230 is similar to an open-circuited path). The secondary coil 222 has a first terminal coupled to a third node N3 for outputting an induced voltage VS, and a second terminal coupled to a ground voltage VSS (e.g., 0V).

The output stage circuit 240 includes a first transistor M1, a second transistor M2, a second capacitor C2, and a third capacitor C3. Each of the first transistor M1 and the second transistor M2 may be an NMOS transistor (N-type Metal Oxide Semiconductor Field Effect Transistor). The first transistor M1 has a control terminal for receiving a clock voltage VA, a first terminal coupled to a fourth node N4, and a second terminal coupled to the third node N3 for receiving the induced voltage VS. In some embodiments, the clock voltage VA comes from the controller 280. The clock voltage VA and the PWM voltage VM substantially have the same waveforms with a phase difference of about 180 degrees therebetween. The second capacitor C2 has a first terminal coupled to the fourth node N4, and a second terminal coupled to the ground voltage VSS. The second transistor M2 has a control terminal for receiving a first control voltage VC1, a first terminal coupled to the output node NOUT, and a second terminal coupled to the fourth node N4. The third capacitor C3 has a first terminal coupled to the output node NOUT, and a second terminal coupled to the ground voltage VSS.

The feedback compensation circuit 250 includes a linear optical coupler 252, a voltage regulator 254, a first resistor R1, a second resistor R2, a fourth capacitor C4, and a fifth capacitor C5. In some embodiments, the linear optical coupler 252 is implemented with a PC817 electronic component. The linear optical coupler 252 includes an LED (Light-Emitting Diode) DL and a BJT (Bipolar Junction Transistor) Q1. The LED DL has an anode coupled to the fourth node N4, and a cathode coupled to a fifth node N5. The BJT Q1 has a collector coupled to a sixth node N6 for outputting a feedback voltage VF, and an emitter coupled to the ground 290. The fourth capacitor C4 has a first terminal coupled to the sixth node N6, and a second terminal coupled to the ground 290. The fifth capacitor C5 has a first terminal coupled to the fifth node N5, and a second terminal coupled to a seventh node N7. The first resistor R1 has a first terminal coupled to the fourth node N4, and a second terminal coupled to the seventh node N7. The second resistor R2 has a first terminal coupled to the seventh node N7, and a second terminal coupled to the ground voltage VSS. In some embodiments, the voltage regulator 254 is implemented with a TL431 electronic component. The voltage regulator 254 has an anode coupled to the ground voltage VSS, a cathode coupled to the fifth node N5, and a reference terminal coupled to the seventh node N7.

The PWM IC 260 generates a PWM voltage VM according to the feedback voltage VF. For example, the PWM IC 260 may be implemented with an error amplifier and a comparator. The PWM voltage VM is configured to fine-tune the duty cycle of the power switch element 230.

The discharging circuit 270 includes a third transistor M3, a fifth diode D5, a sixth capacitor C6, a third resistor R3, and an inductor L1. The third transistor M3 may be an NMOS transistor. The third transistor M3 has a control terminal for receiving a second control voltage VC2, a first terminal coupled to an eighth node N8, and a second terminal coupled to the output node NOUT. The fifth diode D5 has an anode coupled to the eighth node N8, and a cathode coupled to a ninth node N9. The sixth capacitor C6 has a first terminal coupled to the ninth node N9, and a second terminal coupled to the ground voltage VSS. The third resistor R3 has a first terminal coupled to the fourth node N4, and a second terminal coupled to the ninth node N9. The inductor L1 has a first terminal coupled to the eighth node N8, and a second terminal coupled to the ground voltage VSS.

Figure 3:
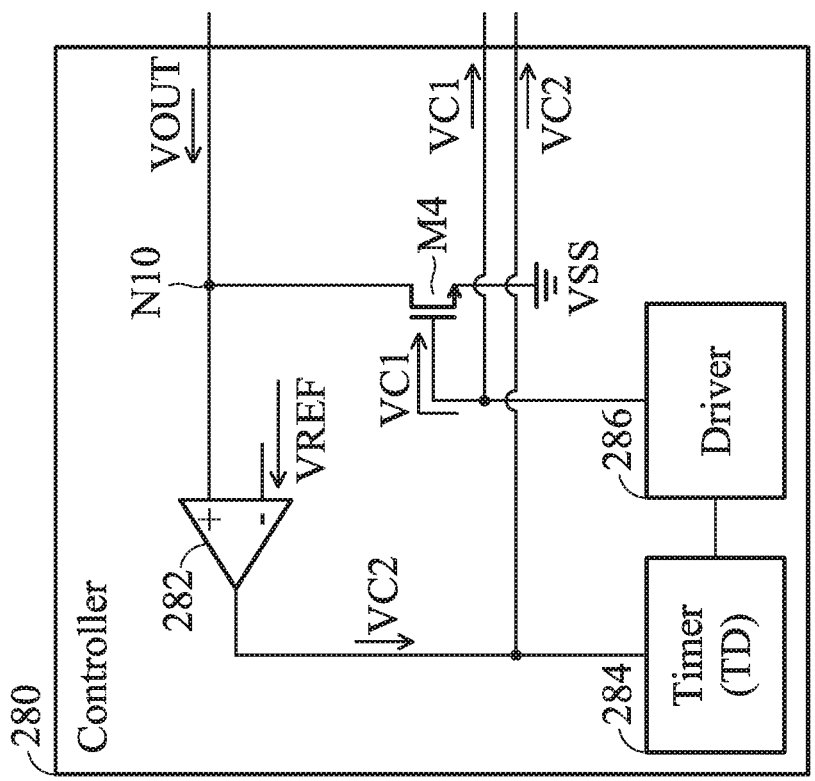
FIG. 3 is a diagram of a controller according to an embodiment of the invention.

FIG. 3 is a diagram of the controller 280 according to an embodiment of the invention. The controller 280 can monitor the output voltage VOUT, and generate the first control voltage VC1 and the second control voltage VC2 according the output voltage VOUT. In the embodiment of FIG. 3, the controller 280 includes a comparator 282, a timer 284, a driver 286, and a fourth transistor M4. The fourth transistor M4 may be an NMOS transistor. The comparator 282 has a positive input terminal coupled to a tenth node N10 for receiving the output voltage VOUT (the tenth node N10 may be directly or indirectly coupled to the output node NOUT), a negative input terminal for receiving a reference voltage VREF, and an output terminal for outputting the second control voltage VC2. For example, if the output voltage VOUT is higher than the reference voltage VREF, the second control voltage VC2 may have a high logic level. Conversely, if the output voltage VOUT is lower than or equal to the reference voltage VREF, the second control voltage VC2 may have a low logic level. The timer 284 controls the driver 286 according to the second control voltage VC2, so as to generate and adjust the first control voltage VC1. In some embodiments, when the second control voltage VC2 rises to a high logic level (e.g., a logic "1"), the timer 284 starts to count a predetermined time period TD. When the second control voltage VC2 falls from the high logic level to a low logic level (e.g., a logic "0"), or when the predetermined time period TD has expired, the driver 286 pulls up the first control voltage VC1 to a driving level. The fourth transistor M4 has a control terminal for receiving the first control voltage VC1, a first terminal coupled to the ground voltage VSS, and a second terminal coupled to the tenth node N10.

In some embodiments, the power switch element 230 includes a fifth transistor M5. The fifth transistor M5 may be an NMOS transistor. The fifth transistor M5 has a control terminal for receiving the PWM voltage VM, a first terminal coupled the ground 290, and a second terminal coupled to the second node N2.

Figure 4:
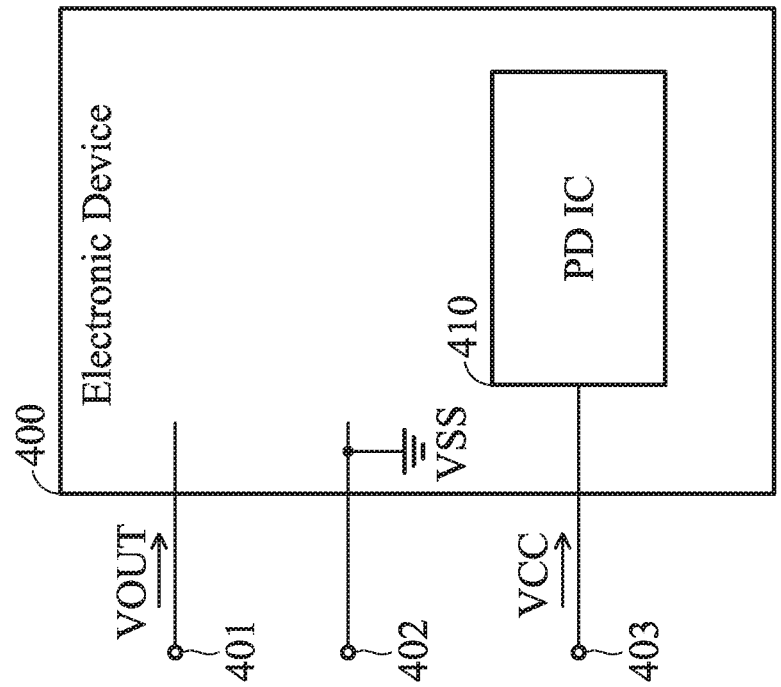
FIG. 4 is a diagram of an electronic device according to an embodiment of the invention.

FIG. 4 is a diagram of an electronic device 400 according to an embodiment of the invention. In the embodiment of FIG. 4, the electronic device 400 with a supply terminal 401, a ground terminal 402 and a CC (Configuration Channel) pin 403 includes a PD IC 410. When it is required to perform an charging operation to the electronic device 400, the supply terminal 401 of the electronic device 400 should be coupled to the output node NOUT of the charging device 200 so as to receive the output voltage VOUT, the ground terminal 402 of the electronic device 400 should be coupled to the ground voltage VSS of the charging device 200, and the CC pin 403 of the electronic device 400 should receive a communication voltage VCC from the controller 280 of the charging device 200.

In some embodiments, the charging device 200 can operate in an initial mode, a standby mode, and a charging mode, and their operation principles is described below.

In the initial mode, the bridge rectifier 210 has not received the first input voltage VIN1 and the second input voltage VIN2, and the electronic device 400 has not been coupled to the charging device 200. At this time, the first transistor M1, the second transistor M2, the third transistor M3, and the fifth transistor M5 are all turned-off (or cut-off).

In the standby mode, the bridge rectifier 210 has received the first input voltage VIN1 and the second input voltage VIN2, but the electronic device 400 has not been coupled to the charging device 200. At this time, the first transistor M1 and the fifth transistor M5 are switched at a high frequency, but the second transistor M2 and the third transistor M3 are still turned-off.

In the charging mode, the bridge rectifier 210 has received the first input voltage VIN1 and the second input voltage VIN2, and the electronic device 400 has been coupled to the charging device 200. The connection of the electronic device 400 may affect the output voltage VOUT of the charging device 200. If the electronic device 400 does not meet the safety input standard, the output voltage VOUT may be temporarily higher than the reference voltage VREF, thereby stopping the charging operation. At this time, in response to the output voltage VOUT, the comparator 282 of the controller 280 outputs the second control voltage VC2 having a high logic level for turning-on the third transistor M3, and triggering the timer 284 to start to count the predetermined time period TD. The turned-on third transistor M3 can enable the discharging circuit 270. Thus, the timer 284 and the driver 286 may operate under two different conditions.

Under a first condition, when the predetermined time period TD has not expired and the discharging circuit 270 has reduced the output voltage VOUT below the reference voltage VREF, the second control voltage VC2 falls from the high logic level to the low logic level, so as to turn-off the third transistor M3 and disable the charging circuit 270. In response to the change in the second control voltage VC2, the timer 284 controls the driver 286 to pull up the first control voltage VC1 to a driving level. At this time, since the second transistor M2 is turned-on, the charging device 200 can perform a charging operation to the electronic device 400.

Under a second condition, when the discharging circuit 270 has not reduced the output voltage VOUT below the reference voltage VREF and the predetermined time period TD has expired, the timer 284 still controls the driver 286 to pull up the first control voltage VC1 to the aforementioned driving level. At this time, the turned-on fourth transistor M4 can pull down the output voltage VOUT at the tenth node N10 to the ground voltage VSS. Thus, the comparator 282 outputs the second control voltage VC2 having a low logic level for turning-off the third transistor M3 and disabling the charging circuit 270. Furthermore, since the second transistor M2 is turned-on, the charging device 200 can perform the charging operation to the electronic device 400.

Specifically, the discharging circuit 270 provides five discharging paths for reducing the output voltage VOUT, which is described below. A first discharging path is formed by the inductor L1. A second discharging path is formed by the fifth diode D5 and the sixth capacitor C6. A third discharging path is formed by fifth diode D5, the third resistor R3, the LED DL of the linear optical coupler 252, and the voltage regulator 254. A fourth discharging path is formed by the BJT Q1 of the linear optical coupler 252. A fifth discharging path is formed by the fourth capacitor C4. By using the aforementioned five discharging paths, the discharging circuit 270 usually can reduce the output voltage VOUT, affected by the electronic device 400, below the reference voltage VREF within the predetermined time period TD. In addition, even if any circuit error results in an excess of the predetermined time period TD, the timer 284 can still force the second transistor M2 to be disabled, and turn-off the third transistor M3, so as to maintain the normal charging operation of the charging device 200. It should be noted the third discharging path using the anode of the LED DL can establish a voltage regulation feedback in advance. According to practical measurements, such as design can further increase the output stability of the charging device 200 when the second transistor M2 is turned-on.

Figure 5:
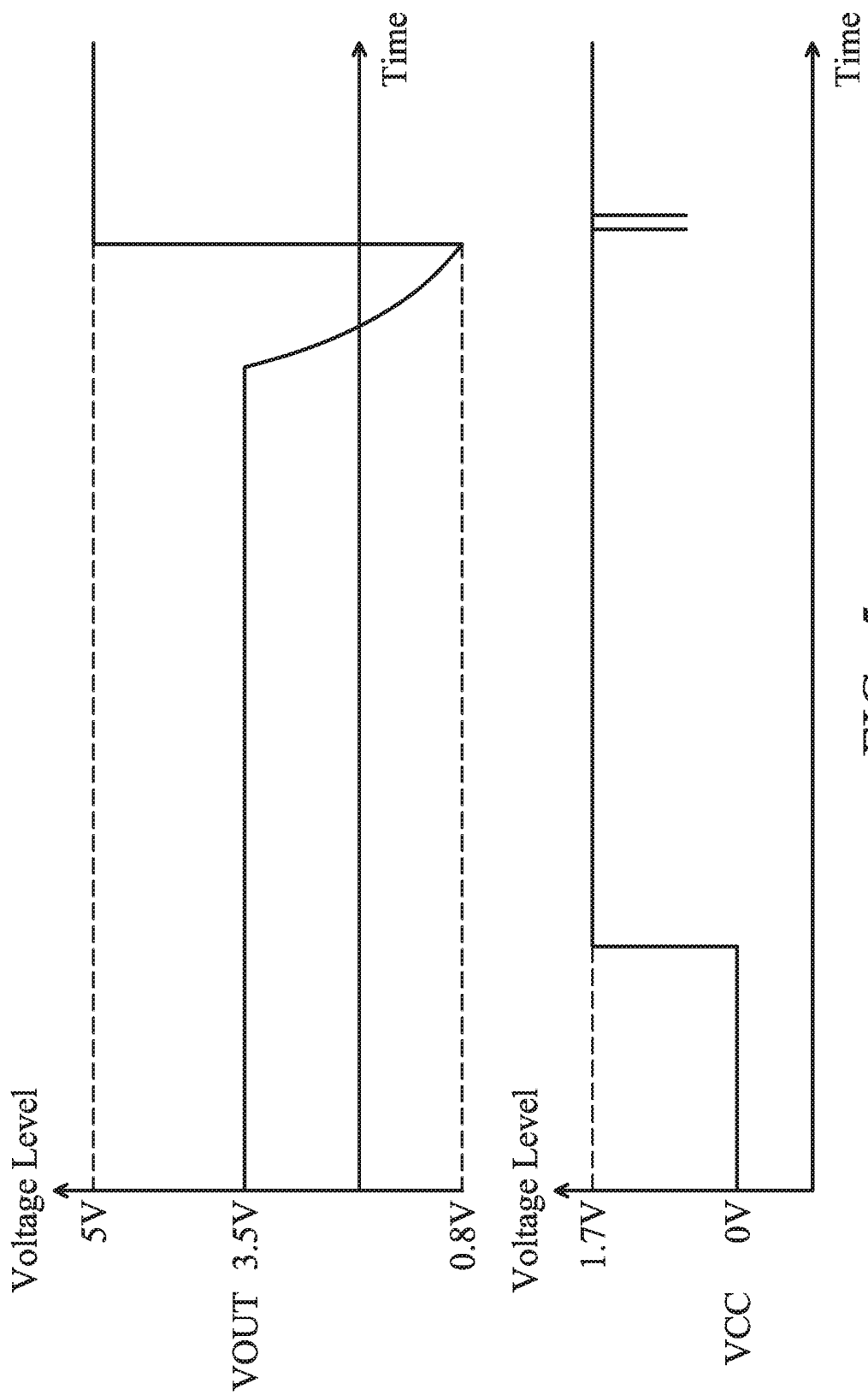
FIG. 5 is a diagram of voltage waveforms of a charging device according to an embodiment of the invention.

FIG. 5 is a diagram of voltage waveforms of the charging device 200 according to an embodiment of the invention. The horizontal axis represents time, and the vertical axis represents a voltage level or current magnitude. According to the measurement of FIG. 5, when the electronic device 400 is initially coupled to the charging device 200, the output voltage VOUT affected by the electronic device 400 may be about 3.5V. Since the output voltage VOUT does not meet the safety input standard, the charging device 200 cannot communicate with the electronic device 400 (the communication voltage VCC may maintained at constant 1.7V). Next, after the discharging circuit 270 of the invention pulls down the output voltage VOUT to 0.8V, the charging device 200 normally performs the charging device to the electronic device 400, and the output voltage VOUT is also pulled up to about 5V. Finally, the charging device 200 and the electronic device 400 have CC pins which are communicating with each other (the communication voltage VCC has up and down fluctuations).

In some embodiments, the element parameters of the charging device 200 are as follows. The resistance of the first resistor R1 may be from 66.31KΩ to 73.29KΩ, such as 69.8KΩ. The resistance of the second resistor R2 may be from 9.69KΩ to 10.71KΩ such as 10.2KΩ. The resistance of the third resistor R3 may be from 4.95KΩ to 5.05KΩ, such as 5KΩ. The capacitance of the second capacitor C2 may be from 646 μF to 714 μF, such as 680 μF. The capacitance of the third capacitor C3 may be from 646 μF to 714 μF, such as 680 μF. The capacitance of the fourth capacitor C4 may be from 99 pF to 101 pF, such as 100 pF. The capacitance of the second capacitor C5 may be from 1.49 nF to 1.51 nF, such as 1.5 nF. The capacitance of the sixth capacitor C6 may be from 29.7 μF to 36.3 μF, such as 33 μF. The inductance of the inductor L1 may be from 315 μH to 385 μH, such as 350 μH. The turn ratio of the main coil 221 to the secondary coil 222 may be from 5 to 100, such as 20. The driving level of the first control voltage VC1 may be about 15V. The predetermined time period TD of the timer 284 may be about 600 mS. The reference voltage VREF may be about 0.8V. The above ranges of parameters are calculated and obtained according to the results of many experiments, and they help to optimize the output stability of the charging device 200.

The invention proposes a novel charging device, which includes a discharging circuit for automatically fine-tuning its output voltage. According to practical measurements, the charging device using the aforementioned design can solve the problem of failure of a charging operation when an electronic device does not meet the safety input standard. The invention can further improve the reliability and output stability of the charging device, and therefore it is suitable for application in a variety of devices.

Note that the above voltages, currents, resistances, inductances, capacitances and other element parameters are not limitations of the invention. A designer can adjust these parameters according to different requirements. The charging device of the invention is not limited to the configurations of FIGS. 1-5. The invention may merely include any one or more features of any one or more embodiments of FIGS. 1-5. In other words, not all of the features displayed in the figures should be implemented in the charging device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:
1. A charging device for supporting PD (Power Delivery), comprising:
  a bridge rectifier, generating a rectified voltage according to a first input voltage and a second input voltage;
  a first capacitor, storing the rectified voltage;
  a transformer, comprising a main coil and a secondary coil, wherein the main coil receives the rectified voltage, and the secondary coil generates an induced voltage;
  a power switch element, selectively coupling the main coil to a ground;
  an output stage circuit, generating an output voltage according to the induced voltage and a first control voltage;
  a feedback compensation circuit, coupled to the output stage circuit, and generating a feedback voltage, wherein the feedback compensation circuit comprises a linear optical coupler and a voltage regulator;
  a PWM (Pulse Width Modulation) IC (Integrated Circuit), generating a PWM voltage according to the feedback voltage;
  a controller, monitoring the output voltage, and generating the first control voltage and a second control voltage according to the output voltage; and
  a discharging circuit, selectively reducing a voltage level of the output voltage according to the second control voltage;
  wherein the linear optical coupler comprises an LED (Light-Emitting Diode) and a BJT (Bipolar Junction Transistor), wherein the LED has an anode coupled to a fourth node, and a cathode coupled to a fifth node, and wherein the BJT has a collector coupled to a sixth node for outputting the feedback voltage, and an emitter coupled to the ground;
  wherein the feedback compensation circuit further comprises:
  a fourth capacitor, wherein the fourth capacitor has a first terminal coupled to the sixth node, and a second terminal coupled to the ground; and a fifth capacitor, wherein the fifth capacitor has a first terminal coupled to the fifth node, and a second terminal coupled to a seventh node.

2. The charging device as claimed in claim 1, wherein the bridge rectifier comprises:
   a first diode, wherein the first diode has an anode coupled to a first input node for receiving the first input voltage, and a cathode coupled to a first node for outputting the rectified voltage;
   a second diode, wherein the second diode has an anode coupled to the ground, and a cathode coupled to the first input node;
   a third diode, wherein the third diode has an anode coupled to a second input node for receiving the second input voltage, and a cathode coupled to the first node; and
   a fourth diode, wherein the fourth diode has an anode coupled to the ground, and a cathode coupled to the second input node;
   wherein the first capacitor has a first terminal coupled to the first node, and a second terminal coupled to the ground.

3. The charging device as claimed in claim 2, wherein the main coil has a first terminal coupled to the first node for receiving the rectified voltage, and a second terminal coupled to a second node, wherein the power switch element selectively couples the second node to the ground according to the PWM voltage, and wherein the secondary coil has a first terminal coupled to a third node for outputting the induced voltage, and a second terminal coupled to a ground voltage.

4. The charging device as claimed in claim 3, wherein the output stage circuit comprises:
   a first transistor, wherein the first transistor has a control terminal for receiving a clock voltage, a first terminal coupled to the fourth node, and a second terminal coupled to the third node for receiving the induced voltage; and
   a second capacitor, wherein the second capacitor has a first terminal coupled to the fourth node, and a second terminal coupled to the ground voltage.

5. The charging device as claimed in claim 4, wherein the output stage circuit further comprises:
   a second transistor, wherein the second transistor has a control terminal for receiving the first control voltage, a first terminal coupled to an output node for outputting the output voltage, and a second terminal coupled to the fourth node; and
   a third capacitor, wherein the third capacitor has a first terminal coupled to the output node, and a second terminal coupled to the ground voltage.

6. The charging device as claimed in claim 5, wherein the feedback compensation circuit further comprises:

a first resistor, wherein the first resistor has a first terminal coupled to the fourth node, and a second terminal coupled to the seventh node; and
   a second resistor, wherein the second resistor has a first terminal coupled to the seventh node, and a second terminal coupled to the ground voltage.

7. The charging device as claimed in claim 6, wherein the voltage regulator has an anode coupled to the ground voltage, a cathode coupled to the fifth node, and a reference terminal coupled to the seventh node.

8. The charging device as claimed in claim 7, wherein the discharging circuit comprises:
   a third transistor, wherein the third transistor has a control terminal for receiving the second control voltage, a first terminal coupled to an eighth node, and a second terminal coupled to the output node.

9. The charging device as claimed in claim 8, wherein the discharging circuit further comprises:
   a fifth diode, wherein the fifth diode has an anode coupled to the eighth node, and a cathode coupled to a ninth node; and
   a sixth capacitor, wherein the sixth capacitor has a first terminal coupled to the ninth node, and a second terminal coupled to the ground voltage.

10. The charging device as claimed in claim 9, wherein the discharging circuit further comprises:
    a third resistor, wherein the third resistor has a first terminal coupled to the fourth node, and a second terminal coupled to the ninth node; and
    an inductor, wherein the inductor has a first terminal coupled to the eighth node, and a second terminal coupled to the ground voltage.

11. The charging device as claimed in claim 10, wherein the controller comprises:
    a comparator, wherein the comparator has a positive input terminal coupled to a tenth node for receiving the output voltage, a negative input terminal for receiving a reference voltage, and an output terminal for outputting the second control voltage.

12. The charging device as claimed in claim 11, wherein the controller further comprises:
    a fourth transistor, wherein the fourth transistor has a control terminal for receiving the first control voltage, a first terminal coupled to the ground voltage, and a second terminal coupled to the tenth node.

13. The charging device as claimed in claim 12, wherein the controller further comprises:
    a timer, wherein when the second control voltage rises to a high logic level, the timer starts to count a predetermined time period; and
    a driver, controlled by the timer, wherein when the second control voltage falls to a low logic level or when the predetermined time period has expired, the driver pulls up the first control voltage to a driving level.

* * * * *